(12) United States Patent
Tan et al.

(10) Patent No.: US 10,021,431 B2
(45) Date of Patent: Jul. 10, 2018

(54) MOBILE COMPUTING DEVICE HAVING VIDEO-IN-VIDEO REAL-TIME BROADCASTING CAPABILITY

(71) Applicant: OMNIVISION TECHNOLOGIES, INC., Santa Clara, CA (US)

(72) Inventors: Kah-Ong Tan, Shanghai (CN); Jizhang Shan, Cupertino, CA (US); Hui Pan, San Jose, CA (US); Guannho George Tsau, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 593 days.

(21) Appl. No.: 13/734,586

(22) Filed: Jan. 4, 2013

(65) Prior Publication Data

US 2014/0192199 A1 Jul. 10, 2014

(51) Int. Cl.
*H04N 5/262* (2006.01)
*G06G 5/00* (2006.01)
(Continued)

(52) U.S. Cl.
CPC ....... *H04N 21/234* (2013.01); *H04N 21/2187* (2013.01); *H04N 21/23418* (2013.01); *H04N 21/2665* (2013.01); *H04N 21/41407* (2013.01); *H04N 21/4223* (2013.01); *H04N 21/42684* (2013.01); *H04N 21/4316* (2013.01);
(Continued)

(58) Field of Classification Search
CPC ...................................................... H04N 5/45
See application file for complete search history.

(56) References Cited

U.S. PATENT DOCUMENTS 7,639,943 B1 * 12/2009 Kalajan ................. G03B 29/00
396/429
7,898,600 B2    3/2011 Lee et al.
(Continued)

FOREIGN PATENT DOCUMENTS

CN        1929538 A    3/2007
CN      202143152 U    2/2012
(Continued)

OTHER PUBLICATIONS

U.S. Appl. No. 13/718,988, filed Dec. 18, 2012.
(Continued)

*Primary Examiner* — Rebecca Volentine
(74) *Attorney, Agent, or Firm* — Christensen O'Connor Johnson Kindness PLLC

(57) ABSTRACT

A mobile computing device includes a first video camera on a first side of the mobile computing device producing a first camera video stream. A second video camera is on a second side of the mobile computing device producing a second camera video stream. A video processor is coupled to the first video camera and the second video camera to receive the first camera video stream and the second camera video stream, respectively. The video processor is coupled to merge the first camera video stream and the second camera video stream to generate a merged video stream. The video processor includes a network interface coupled to upload the merged video stream to a server in real-time using an Internet wireless network. The server broadcasts the merged video stream to a plurality of receivers in real-time.

20 Claims, 9 Drawing Sheets

(51) Int. Cl.
*H04N 7/18* (2006.01)
*H04N 21/234* (2011.01)
*H04N 21/2187* (2011.01)
*H04N 21/2665* (2011.01)
*H04N 21/414* (2011.01)
*H04N 21/4223* (2011.01)
*H04N 21/426* (2011.01)
*H04N 21/431* (2011.01)
*H04N 21/44* (2011.01)
*H04N 21/61* (2011.01)
*H04N 21/4788* (2011.01)

(52) U.S. Cl.
CPC ....... *H04N 21/44* (2013.01); *H04N 21/44008* (2013.01); *H04N 21/6131* (2013.01); *H04N 21/6181* (2013.01); *H04N 21/4788* (2013.01)

(56) References Cited

U.S. PATENT DOCUMENTS

| | | | |
|---|---|---|---|
| 7,991,285 B2 * | 8/2011 | Tan | 396/322 |
| 8,081,684 B2 | 12/2011 | Lee et al. | |
| 2006/0114987 A1 | 6/2006 | Roman | |
| 2006/0171336 A1 * | 8/2006 | MacDonald | H04N 7/152 370/260 |
| 2006/0187227 A1 | 8/2006 | Jung et al. | |
| 2007/0024706 A1 * | 2/2007 | Brannon, Jr. | H04N 7/17318 348/142 |
| 2007/0057866 A1 * | 3/2007 | Lee et al. | 345/1.1 |
| 2007/0065143 A1 * | 3/2007 | Didow et al. | 396/429 |
| 2007/0136782 A1 * | 6/2007 | Ramaswamy | G11B 27/11 725/138 |
| 2008/0005676 A1 * | 1/2008 | Evans et al. | 715/740 |
| 2008/0066092 A1 * | 3/2008 | Laude | H04N 7/088 725/20 |
| 2008/0084482 A1 * | 4/2008 | Hansson et al. | 348/218.1 |
| 2009/0156181 A1 * | 6/2009 | Athsani | H04L 12/58 455/414.2 |
| 2009/0165031 A1 * | 6/2009 | Li | G06F 21/10 725/22 |
| 2009/0172724 A1 * | 7/2009 | Ergen | G06Q 30/02 725/32 |
| 2010/0014710 A1 | 1/2010 | Chen et al. | |
| 2010/0053212 A1 * | 3/2010 | Kang | H04N 21/23412 345/629 |
| 2010/0053436 A1 | 3/2010 | Arisaka | |
| 2010/0164689 A1 | 7/2010 | Napolitano | |
| 2011/0066684 A1 * | 3/2011 | Dorso | H04L 65/1069 709/204 |
| 2011/0164689 A1 | 7/2011 | De Neve et al. | |
| 2011/0187811 A1 * | 8/2011 | Kim et al. | 348/14.01 |
| 2011/0187872 A1 * | 8/2011 | Wang | H04N 5/225 348/207.1 |
| 2011/0249073 A1 * | 10/2011 | Cranfill et al. | 348/14.02 |
| 2012/0026278 A1 * | 2/2012 | Goodman et al. | 348/14.08 |
| 2012/0154526 A1 | 6/2012 | Ji et al. | |
| 2012/0188345 A1 * | 7/2012 | Salow | H04N 21/2743 348/47 |
| 2012/0206565 A1 * | 8/2012 | Villmer | H04N 1/00 348/36 |
| 2012/0254301 A1 | 10/2012 | Fiero | |
| 2012/0254618 A1 * | 10/2012 | Moore | H04N 21/4181 713/175 |
| 2012/0324404 A1 | 12/2012 | Pahlavan et al. | |
| 2012/0327172 A1 * | 12/2012 | El-Saban et al. | 348/14.02 |
| 2013/0113996 A1 * | 5/2013 | Zhu | H04N 5/45 348/565 |
| 2013/0235224 A1 * | 9/2013 | Park | H04N 5/23222 348/218.1 |
| 2014/0152873 A1 * | 6/2014 | Troxel | H04N 5/2621 348/239 |
| 2014/0192198 A1 | 7/2014 | Tsau et al. | |

FOREIGN PATENT DOCUMENTS

| | | |
|---|---|---|
| TW | 201006236 A | 2/2010 |
| TW | 201019723 A | 5/2010 |
| TW | M417729 U | 12/2011 |

OTHER PUBLICATIONS

TW Patent Application No. 102129345—Taiwanese Office Action and Search Report, with English Translation, dated May 26, 2015 (17 pages).
CN Patent Application No. 201310405595.4—Chinese Office Action and Search Report, with English Translation, dated Jul. 29, 2016 (15 pages).
CN Patent Application No. 201310405595.4—Chinese Office Action and Search Report, with English Translation, dated Aug. 17, 2017, 17 pages.
Fourth Chinese Office Action and Translation dated Feb. 13, 2018, for Chinese Application No. 201310405595.4, filed Sep. 9, 2013, 15 pages.

* cited by examiner

MOBILE COMPUTING DEVICE HAVING VIDEO-IN-VIDEO REAL-TIME BROADCASTING CAPABILITY

BACKGROUND INFORMATION

Field of the Disclosure

The present invention relates generally to a mobile computing device, and more specifically to a mobile phone or smartphone having video-in-video (ViV) real-time broadcasting capability.

Background

It has become common to share videos online. Typically, a video stream is uploaded from a stored video file to a server. A plurality of receivers may download the uploaded video file from the server at later times. The stored video file may be produced by a single video camera. The uploading and downloading of the video file are not performed in real-time.

Mobile computing devices such as mobile phones, smartphones, tablet computers or the like have become ubiquitous. Indeed, it is believed that the number of mobile phones in the world today is approaching, if not surpassing, the population of the entire world. There is now a growing demand for the ability to broadcast a real-time video stream from a mobile phone.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
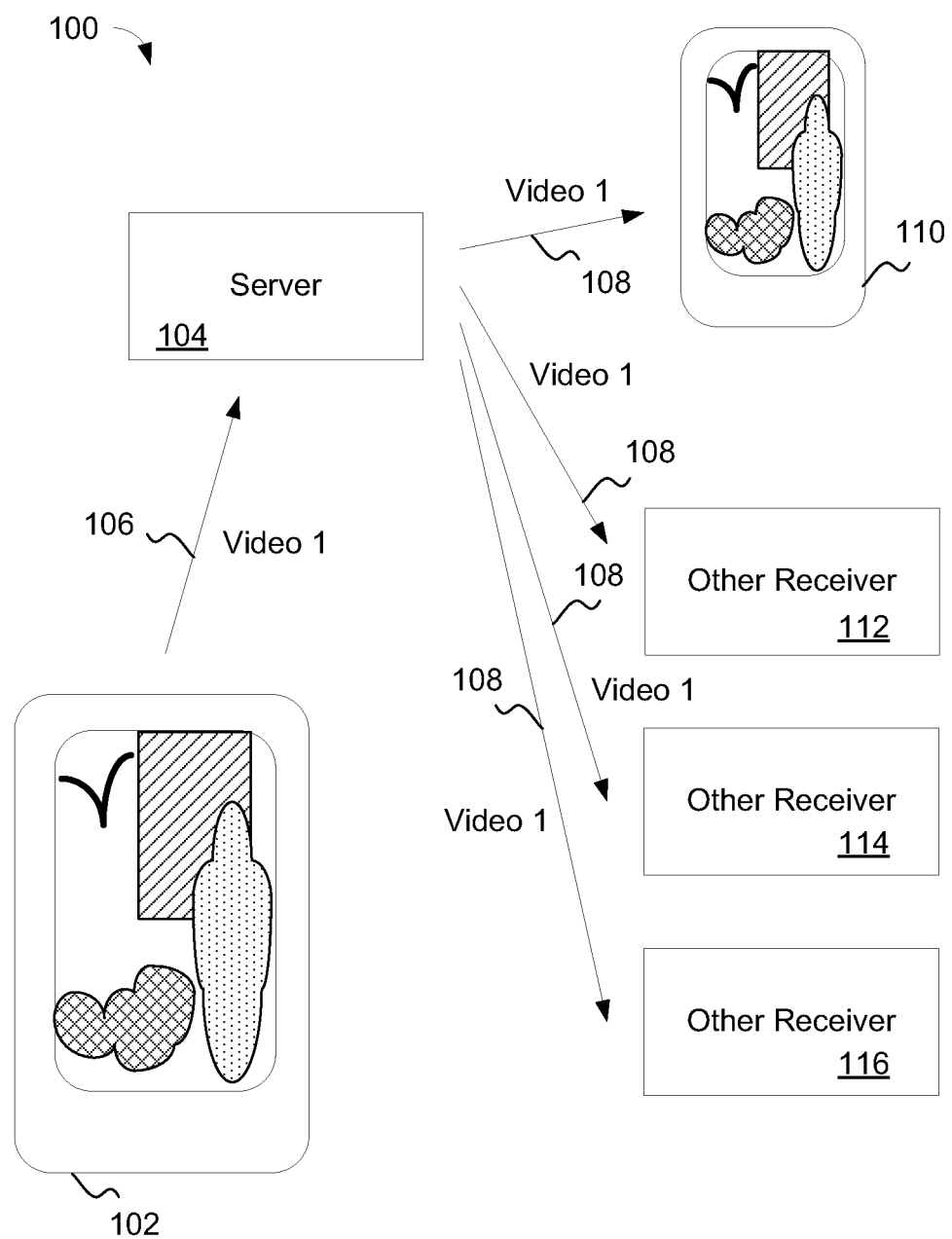
FIG. 1 shows an example mobile computing device connected to a server through the Internet in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As an increasing number of mobile phones include multiple video cameras, the merging of multiple video streams from multiple video cameras of the same mobile phone forming a single video-in-video (ViV) video stream may be useful. As will be discussed, examples in accordance with the teachings of the present invention combine a video stream taken by a front camera of a mobile computing device, such as for example a mobile phone, smartphone, tablet, or the like, with a video stream taken by a back camera of the mobile computing device. Since the front camera faces the user of the mobile computing device, the front camera video stream will include a subject, which is the user of the mobile computing device. The back camera of the mobile computing device faces the view that the user of the mobile computing device also faces. In one example, the video may be pre-processed such that the subject in the front camera video stream can be extracted and overlaid on the back camera video stream. Furthermore, the overlaid subject can be properly scaled. Thus, a ViV video stream showing a subject, which is properly scaled, with the background that is viewed by the subject can be produced by merging the pre-processed front camera video stream and the back camera video stream. In one example, the merged ViV video stream may be uploaded to a server and then broadcasted by the server in real-time through the Internet. Thus, in one example, a live view of an ongoing event can be broadcasted in real-time with a presenter overlaid on the live view. Since the presenter actually views the live view, the presenter can comment precisely on the live view in accordance with the teachings of the present invention.

To illustrate, FIG. 1 shows an example mobile computing device 102, such as for example a mobile phone, smartphone, tablet computer, or the like, connected to a server 104 in a network 100 through the Internet in accordance with the teachings of the present invention. As shown in the depicted example, network 100 includes mobile computing device 102, server 104, and a plurality of receivers 110, 112, 114, and 116. The Internet includes wireless and wired networks. In the illustrated example, mobile computing device 102 uses a wireless network to connect with server 104. The Internet wireless network may include at least one or more of a Wi-Fi network, a mobile broadband network, a telephone network, or any other appropriate wireless network connection such that mobile computing device 102 wirelessly uploads 106 a video stream Video 1 to server 104.

In one example, prior to uploading 106 video stream Video 1 to server 104, server 104 verifies an identification (ID) of mobile computing device 102. In the example, unless the ID of mobile computing device 102 is verified by server 104, mobile computing device 102 is not authorized to upload video stream Video 1 to server 104. A password may be assigned to verify the authorized user of mobile computing device 102. In one example, video stream Video 1 is a real-time video stream captured by mobile computing device 102. In one example, video stream Video 1 may be a recorded video stream, which is previously stored in mobile computing device 102.

In the depicted example, mobile computing device 102 is a smartphone having at least a video camera for capturing video scenes. For purposes of this disclosure, a smartphone may be considered to be a mobile phone built on a mobile operating system (OS) having more advanced computing capabilities and connectivity than a feature phone. A smartphone may include the functionality of a personal digital assistant (PDA), a portable media player, and a global positioning system (GPS) navigation unit, in addition to video cameras, a touch screen, and a web browser. Examples of a mobile operating system (OS) used by modern smartphones include, but are not limited to, Android, iOS, Symbian, BlackBerry OS, Bada, Windows Phone, webOS, and embedded Linux, among others.

Referring back to the example illustrated in FIG. 1, after server 104 secures the connection with mobile computing device 102, mobile computing device 102 uploads 106 video stream Video 1 to server 104. Video stream Video 1 may be a real-time video stream captured by mobile computing device 102. Server 104 may then broadcast the received real-time video stream Video 1 through the Internet. The broadcast in real-time 108 by server 104 through the Internet may by through at least one of a wired Internet network and/or wireless Internet network to individual receivers, such as for example receivers 110, 112, 114, and 116. As shown in the depicted example, the receivers of the broadcasted real-time video stream Video 1 may include another mobile computing device 110. In the illustrated example, mobile computing device 110 is a mobile phone, smartphone, tablet computer, or the like. In this manner, the user of mobile computing device 110 may watch real-time video stream Video 1. Similarly, other receivers 112, 114, and 116 may watch real-time broadcasted video stream Video 1 at the same time.

In one example, receivers 110-116 may be pre-selected by mobile computing device 102 or server 104. The IDs of receivers 110-116 are verified by server 104 before securing the connections in accordance with the teachings of the present invention. In another example, receivers of the broadcasted real-time video stream are not pre-selected, and thus any receiver may receive the broadcasted real-time video stream by appropriate connection to server 104 in accordance with the teaching of the present invention.

In one example, server 104 utilizes standard methods well known in the art to secure the connections with mobile computing device 102 and for broadcasting the respective real-time video streams to receivers 110-116. In the depicted example, video stream Video 1 includes both video and audio signals. Video stream Video 1 may also include text, graphics, and other data embedded in the video stream.

Figure 2:
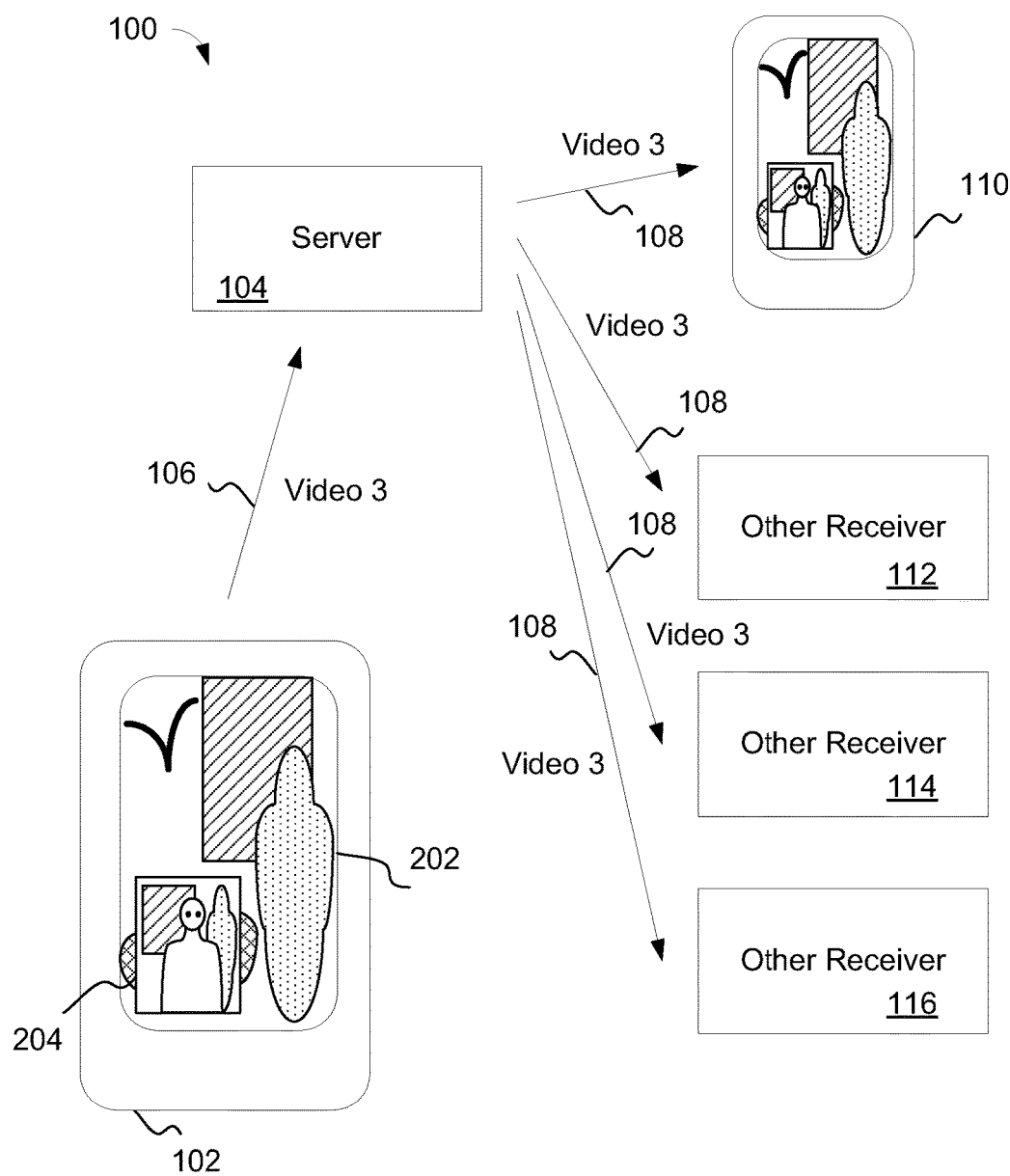
FIG. 2 shows an example mobile computing device that uploads a video stream, which is merged from a front camera video stream and a back camera video stream in accordance with the teachings of the present invention.

FIG. 2 shows an example mobile computing device 102 connected to a server 104 in a network 100 through the Internet in accordance with the teachings of the present invention. As shown in the depicted example, network 100 includes mobile computing device 102, server 104, and a plurality of receivers 110, 112, 114, and 116. It is noted that the example depicted in FIG. 2 shares many similarities with the example depicted in FIG. 1. One difference between the example depicted in FIG. 2 and FIG. 1 is that in the example depicted in FIG. 2, mobile computing device 102 uploads 106 a video stream Video 3 in accordance with the teachings of the present invention. In the example depicted in FIG. 2, video stream Video 3 includes a combination of Video 1 202 and Video 2 204 in accordance with the teachings of the present invention. In the example, mobile computing device 102 includes two digital or video cameras on the front and back sides of mobile computing device 102, which produce Video 2 204 and Video 1 202, respectively, in accordance with the teachings of the present invention.

Figure 3:
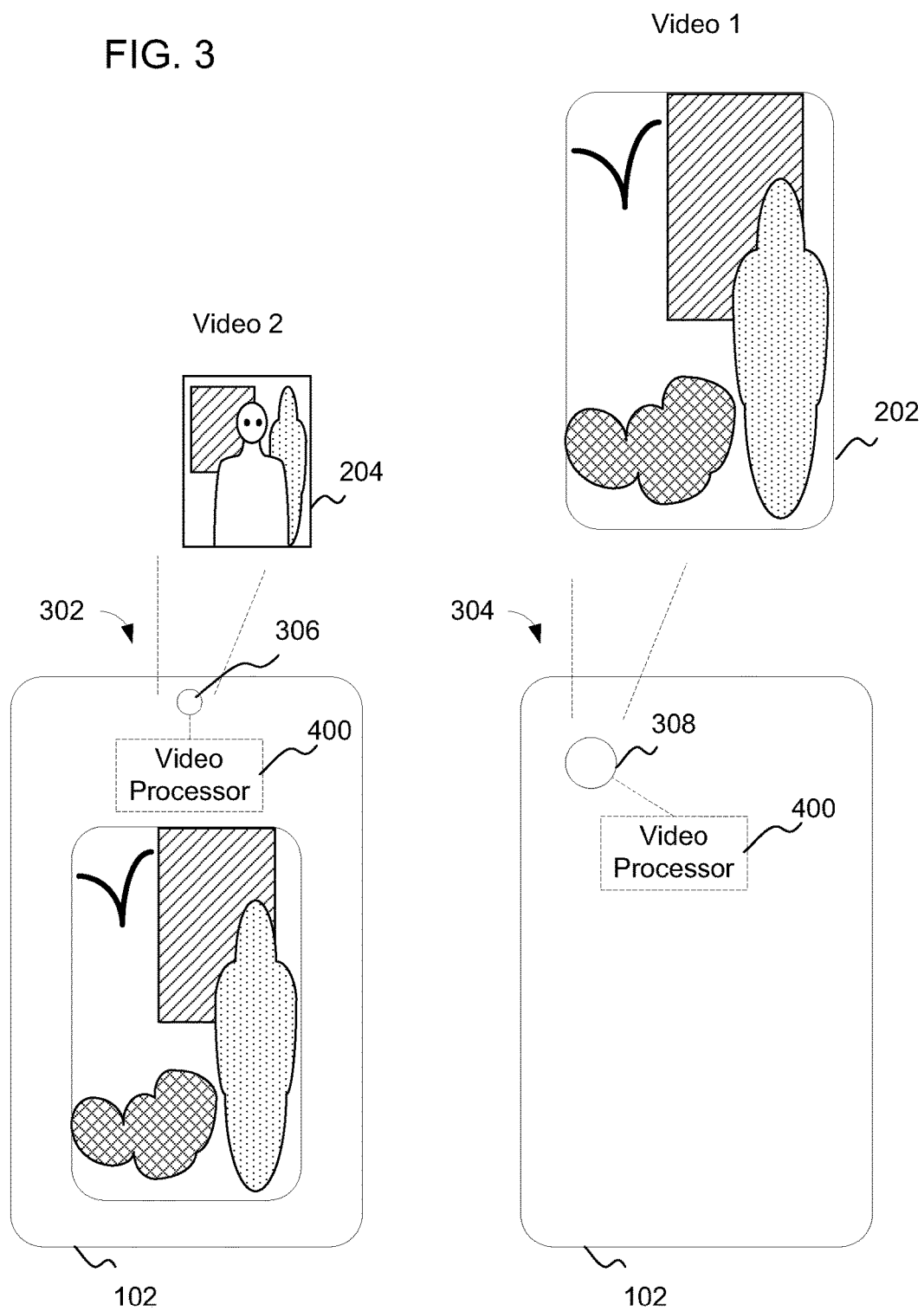
FIG. 3 shows a front side of an example mobile computing device having a camera facing the user of the mobile computing device, and a back side of the mobile computing device having a camera facing the view that is faced by the user of the mobile computing device in accordance with the teachings of the present invention.

To illustrate, FIG. 3 shows an example of a front side 302 of mobile computing device 102 having a camera 306 facing the user of mobile computing device 102 in accordance with the teachings of the present invention. FIG. 3 also shows a back side 304 of mobile computing device 102 having a camera 308 facing the view that is faced by the user of mobile computing device 102 in accordance with the teachings of the present invention. Camera 306 produces front camera video stream Video 2 204, which may be the view showing the user of mobile computing device 102. As shown in the example, a video processor 400 is coupled to camera 306 to receive and to process front camera video stream Video 2 204. Camera 308 produces back camera video stream Video 1 202, which may be the view that the user of mobile computing device 102 faces. As shown in the example, video processor 400 is coupled to camera 308 to receive and to process back camera video stream Video 1 202.

As will be discussed in greater detail below, in one example, video processor 400 is coupled to merge front camera video stream Video 2 204 and back camera video stream Video 1 202 to generate a merged video stream. In one example, video processor 400 includes a network interface coupled to upload the merged video stream to a server in real-time using an Internet wireless network, and then the server broadcasts the merged video stream to a plurality of receivers in real-time in accordance with the teachings of the present invention.

Figure 4:
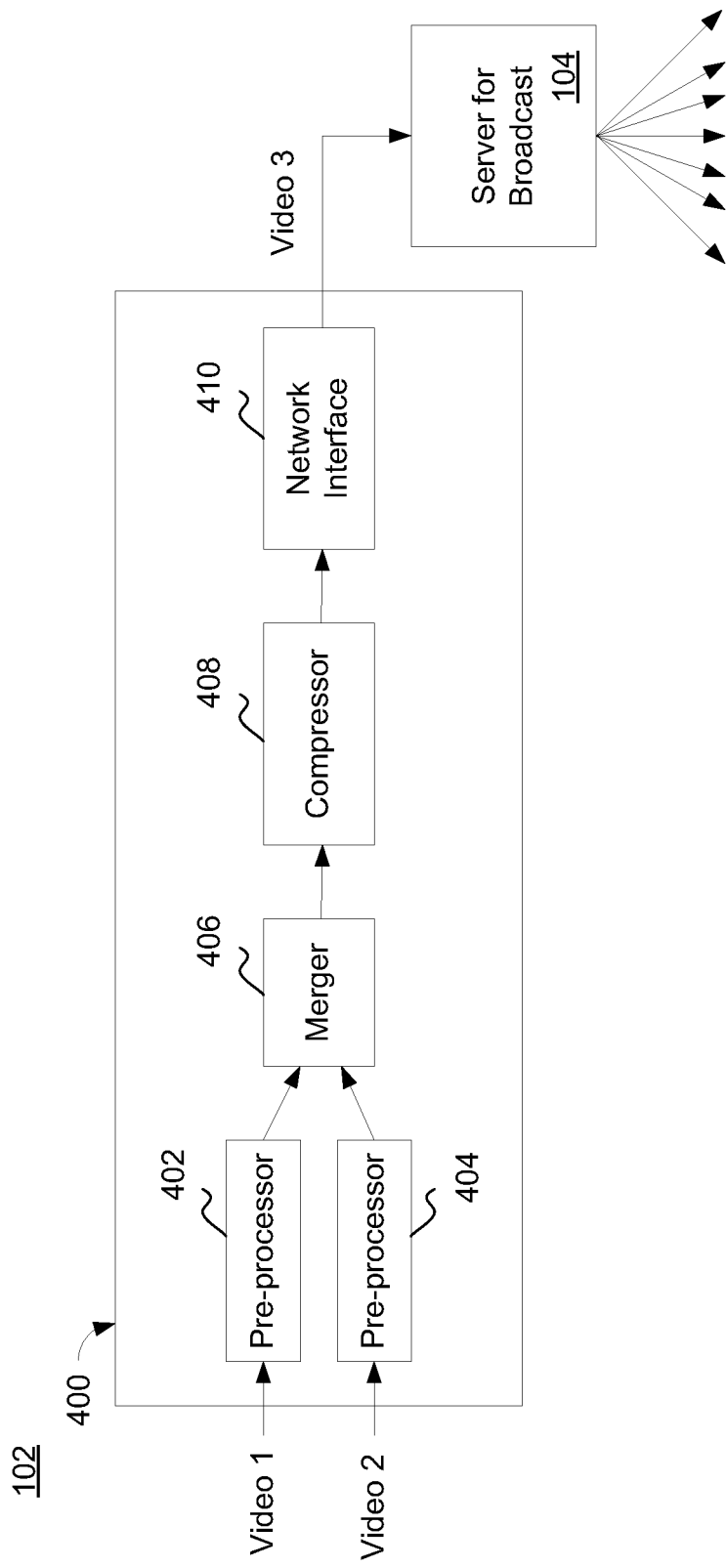
FIG. 4 shows an example block diagram of video processing performed in an example mobile computing device in accordance with the teachings of the present invention.

To illustrate, FIG. 4 shows one example block diagram of a video processor 400 included in example mobile computing device 102, in accordance with the teachings of the present invention. As shown in the depicted example, Video 1 and Video 2 are input to pre-processors 402 and 404, respectively, of video processor 400. The respective outputs of pre-processor 402 and pre-processor 404 are coupled to be received by merger 406. In the example, after Video 1 and Video 2 are pre-processed in pre-processor 402 and pre-processor 404, the pre-processed Video 1 and Video 2 are merged in a merger 406 to form a single ViV video stream, which is output from merger 406 to compressor 408 in the depicted example. Video 1 and Video 2 may include video and audio signals. In addition, text, graphics, and other data may be embedded in the merged ViV video stream. The merged ViV video stream may also include the merged video signal and the merged audio signal. In one example, the merged ViV video stream is compressed in compressor 408 and then compressed merged video ViV video stream is output to network interface 410 as shown. In one example, network interface 410 may upload compressed merged video ViV video stream Video 3 to server 104 for broadcast in accordance with the teachings of the present invention.

Video 1 may be video stream 202 produced by back camera 308 of mobile computing device 102 as shown in FIG. 3. Video 2 may be video stream 204 produced by front camera 306 of mobile computing device 102 as shown in FIG. 3. The sizes and aspect ratios of Video 1 and Video 2 may be altered by pre-processors 402 and 404. For illustration, Video 1 is unaltered, while Video 2 is altered to arbitrarily fit in Video 1 forming a ViV video stream. In one example, Video 3 is a ViV video stream, in which a smaller-size Video 2 is embedded in full-size Video 1. It is appreciated that Video 3 is a single video stream.

Figure 5:
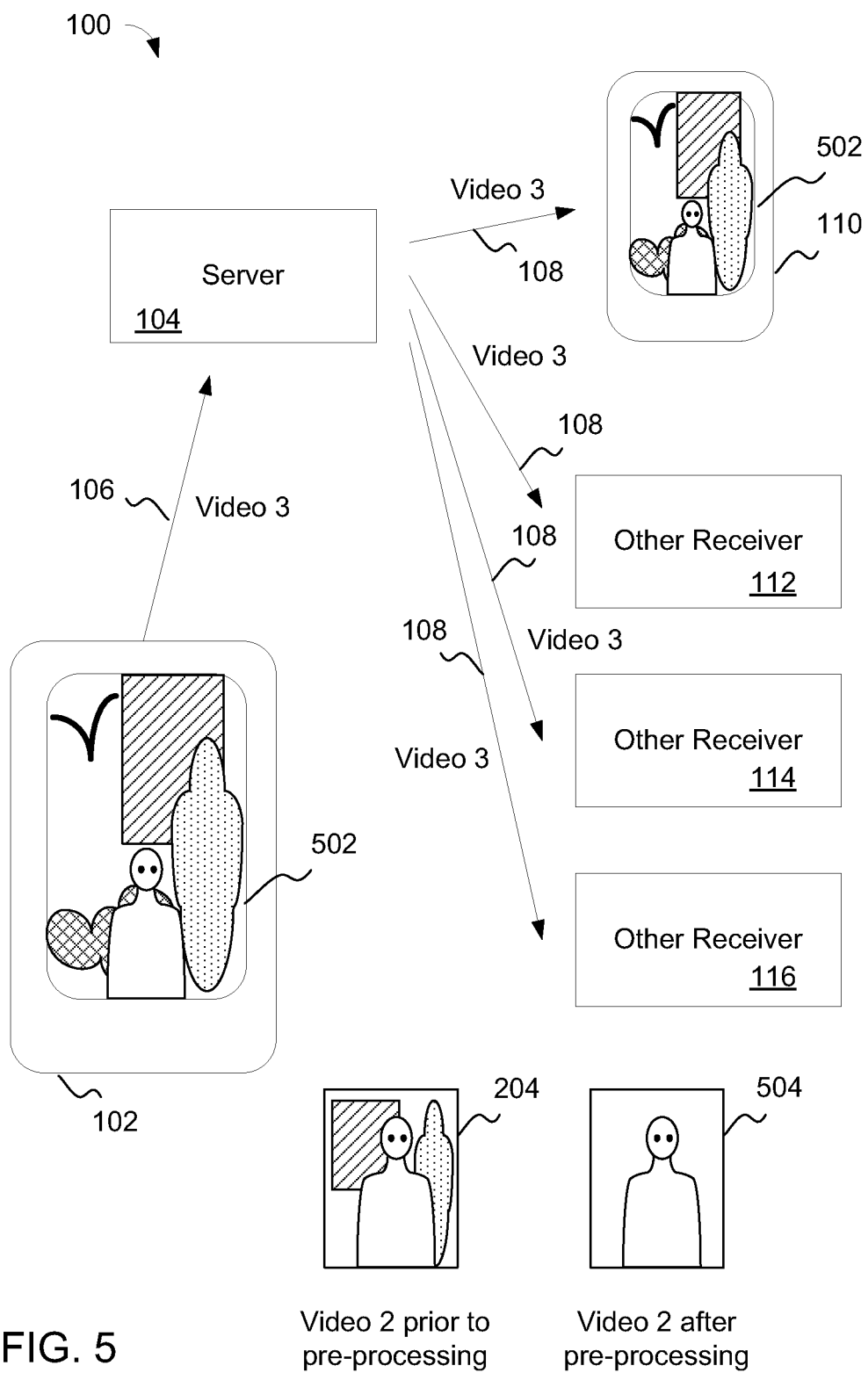
FIG. 5 shows an example video stream that is pre-processed by an example pre-processor before being merged into a merged ViV video stream in accordance with the teachings of the present invention.

FIG. 5 shows an example in which video stream Video 2 204 is pre-processed by pre-processor 404 of FIG. 4, before being merged into ViV video stream Video 3 in accordance with the teachings of the present invention. Video 2 prior to pre-processing 204 and Video 2 after pre-processing 504 are depicted in FIG. 5. As shown in the illustrated example, after pre-processing, Video 2 504 is altered to include only the user of mobile computing device 102, with the background scene of the user of mobile computing device 102 removed. In other words, the background scene in Video 2 204 is trimmed by pre-processor 404 to form Video 2 504 to include a subject alone.

In one example, standard methods that are well known in the art may be utilized by pre-processor 404 to trim the background scene from Video 2 204. For instance, in one example, a green screen or a blue screen technique may be utilized. The green screen or blue screen techniques, which are also known as chroma key compositing or chroma keying, are a special techniques for composing or layering two images or video streams (e.g., Video 1 and Video 2) together based on color hues or chroma ranges. The technique has been used heavily in many fields to remove a background from the subject of a photo or video, such as for example in newscasting. A color range in the top layer is made transparent, revealing another video behind. This can be done with backgrounds of any color that are uniform and distinct, but green and blue backgrounds are commonly used because these colors differ most distinctly in hue from most human skin colors. No part of the subject in the video may duplicate a color used in the background.

To illustrate, green screen or blue screen techniques are often used in weather forecast news broadcasts on television, in situations where the meteorologist appears to be standing in front of a large weather map during live television newscasts. However, in reality, the meteorologist is actually standing in front of a large blue or green background screen. When using a blue screen, different weather maps (e.g., Video 1) are added on the parts of the image where the color is blue. If the meteorologist wears blue clothes, his or her clothes will also be replaced with the background video (e.g., Video 1). A similar system is used for green screens. Various computer programs are available to create videos using green screen or blue screen techniques.

In this manner, the subject stands in front of a green or blue screen. Front camera 306 produces Video 2 of the subject. The background green or blue screen is trimmed by pre-processor 404. The remaining subject of Video 2 is superimposed on Video 1 produced by back camera 308, forming a single merged ViV video stream Video 3 502 as shown in FIG. 5. Merged ViV Video 3 is uploaded in real-time to server 104. Server 104 broadcasts ViV video stream Video 3 502 in real-time as shown in FIG. 5.

Figure 6:
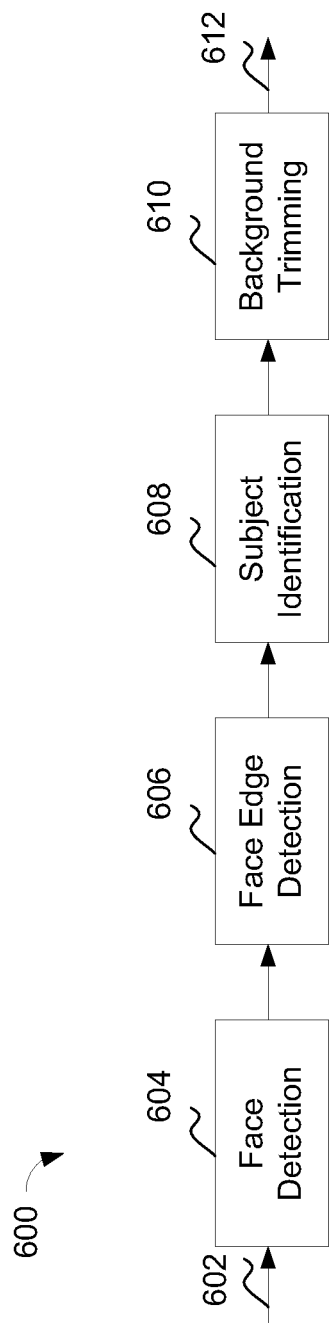
FIG. 6 shows an example functional block diagram of processing to identify a subject in a video scene in accordance with the teachings of the present invention.

In one example, the subject using mobile computing device 102 is not required to stand in front of a green or blue screen. In one example, pre-processor 404 of mobile computing device 102 utilizes advanced processing to trim the background scene from Video 2 204 to form Video 3 504 including a subject alone prior to being merged with merger 406 in accordance with the teachings of the present invention. For example, FIG. 6 depicts a functional block diagram illustrating processing blocks of one example of processing 600 to identify a subject in a video scene, which may be implemented in pre-processor 404 in accordance with the teachings of the present invention. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In one example, a front camera video stream 602 is coupled to be received from the front camera of a mobile computing device by a face detection unit 604 of processing 600. Face detection includes processing technology that determines the locations and sizes of human faces in arbitrary digital images. In one example, face detection unit 604 detects facial features and ignores anything else, such as buildings, trees and bodies. Face detection is commonly used in autofocus of a digital camera. After the face of the subject is detected, the edge of the face is determined in a face edge detection unit 606. The location and edge of the face are thus identified. Following the face edge detection by face edge detection unit 606, the body of the subject can also be identified and located as the extension from the face. The subject, which includes the face and the body, is identified in a subject identification unit 608. Following the subject identification by subject identification unit 608, the background in video stream 602 excluding the face and the body of the subject can be trimmed from the video stream in a background trimming unit 610. The video stream showing the face and the body of the subject alone without the background is output from background trimming unit 610 as a video stream 612 in accordance with the teachings of the present invention. In various examples, it is appreciated that the processing blocks of processing 600 can be implemented in hardware, computer software, firmware, and/or combinations thereof, included in mobile computing device 102 in accordance with the teachings of the preset invention.

Thus, in this manner, the user of mobile computing device 102 can stand in front of substantially any background. Front camera 306 produces Video 2 of the user in front of the background and then the background is substantially trimmed from Video 2 by pre-processor 404. The remaining subject of Video 2 is then superimposed over the Video 1 produced by back camera 308, forming a single merged ViV video stream Video 3 502 as shown in FIG. 5 in accordance with the teachings of the present invention. The merged ViV Video 3 is then uploaded in real-time to server 104. Server 104 broadcasts ViV video stream Video 3 502 in real-time as shown in FIG. 5.

Figure 7:
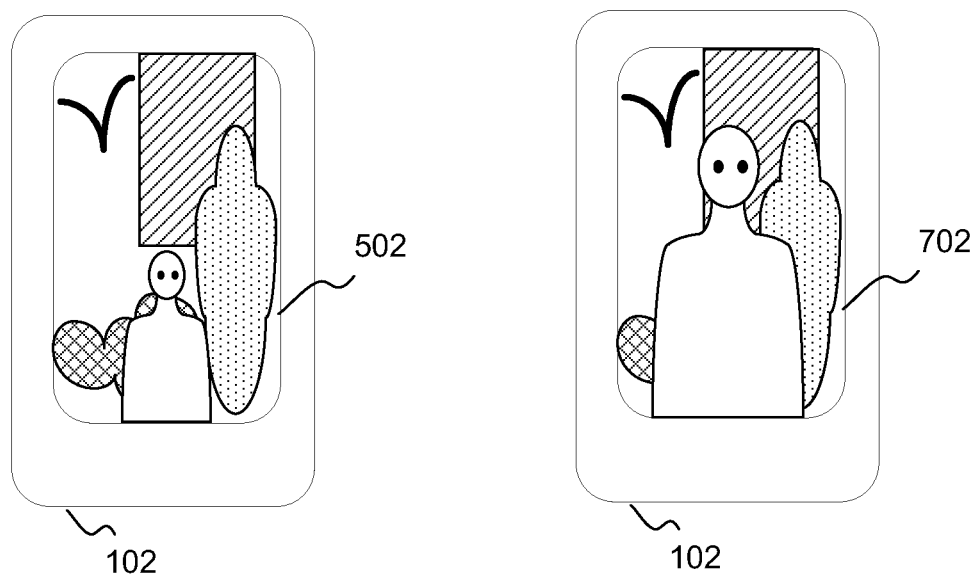
FIG. 7 shows an example of a remaining subject that is properly scaled in accordance with the teachings of the present invention.

FIG. 7 illustrates an example in which before the user or subject shown in Video 2 is superimposed or overlaid on Video 1, the subject may optionally be scaled to produce a more realistic appearance of a ViV video stream Video 3 702, in accordance with the teachings of the present invention. For example, a subject in ViV video stream Video 3 502 may be scaled up to produce a subject in ViV video stream Video 3 702. It is appreciated that the user or subject can be scaled up or down. The user of mobile computing device 102 usually holds mobile computing device 102 at a predetermined arms length distance or less that is comfortable for him or her for viewing a view displayed on the mobile phone while talking to the mobile phone. Thus the size of the image of the subject (the user of mobile computing device 102) will typically be predetermined and fixed. The scaling will make it possible to change the size of the subject relative to the background, which is video stream Video 1 202 produced by back camera 308.

Figure 8:
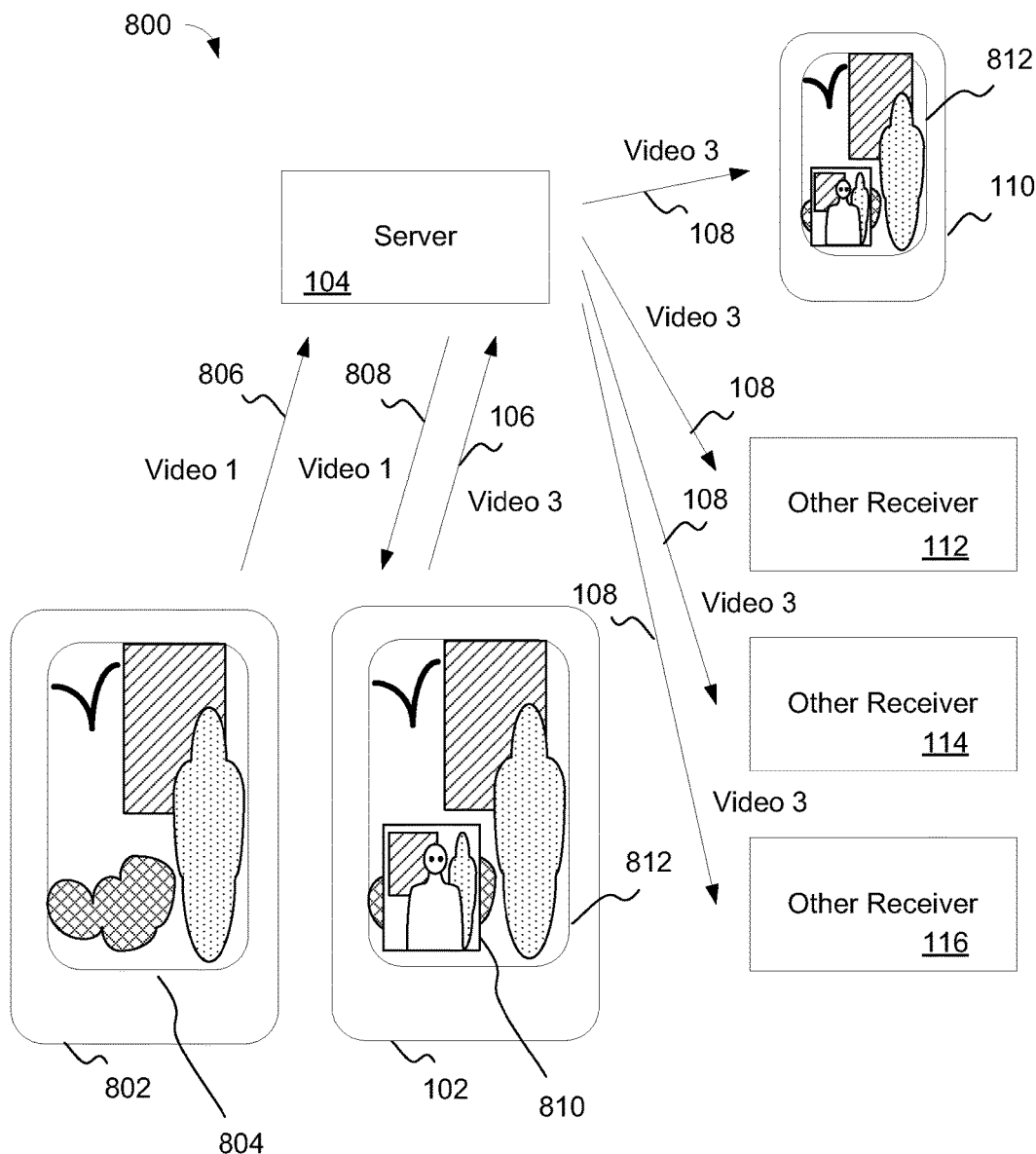
FIG. 8 shows an example of a second mobile computing device uploading a video stream replacing the back camera video stream in accordance with the teachings of the present invention.

FIG. 8 shows another example similar to the example illustrated in FIG. 2 in accordance with the teachings of the present invention. As shown in the depicted example, a mobile computing device 802 uploads 806 a real-time video stream Video 1 804 to server 104 in a network 800. In the illustrated example, mobile computing device is a mobile phone, smartphone, tablet computer, or the like. Network 800 includes mobile computing device 102, mobile computing device 802, server 104, and a plurality of receivers 110, 112, 114, and 116. With a proper ID verification process, mobile computing device 102 receives 808 real-time video stream Video 1 804 from server 104. A video stream Video 2 810 produced by the front camera of mobile computing device 102 is merged with real-time video stream Video 1 804 forming a real-time ViV video stream Video 3 812. The merged ViV Video 3 812 is uploaded 106 in real-time to server 104. Server 104, in turn, broadcasts Video 3 812 in real-time to receivers 110-116.

Figure 9:
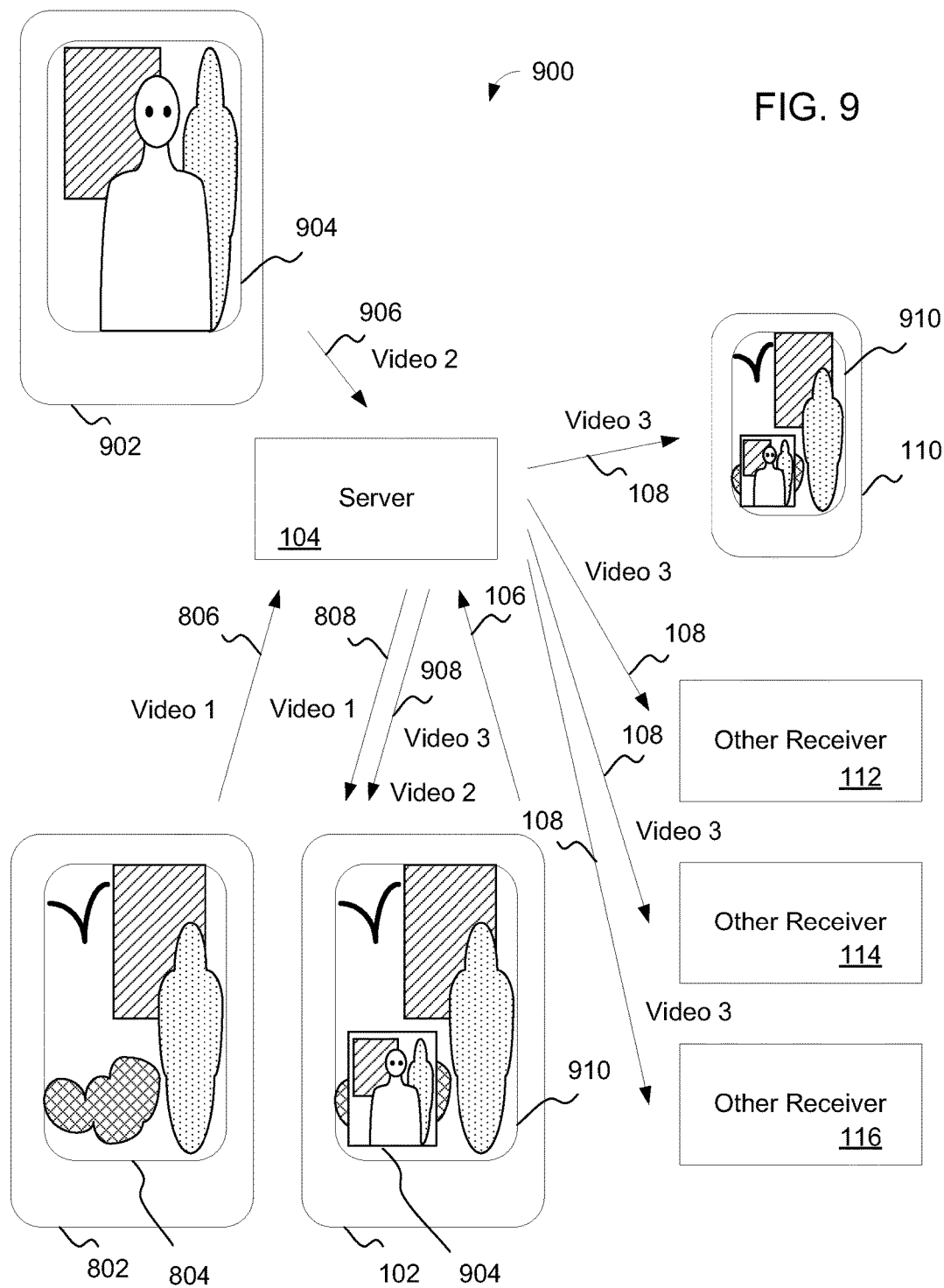
FIG. 9 shows an example of a second mobile computing device uploading a video stream replacing the back camera video stream and a third mobile computing device uploading a video stream replacing the front camera video stream in accordance with the teachings of the present invention.

FIG. 9 also shows yet another example similar to FIG. 2 in accordance with the teachings of the present invention. Mobile computing device 802 uploads 806 real-time video stream Video 1 804 to server 104 in a network 900. Network 900 includes mobile computing device 102, mobile computing device 802, mobile computing device 902, server 104, and a plurality of receivers 110, 112, 114, and 116. In the illustrated example, mobile computing device 902 is a mobile phone, smartphone, tablet computer, or the like. Mobile computing device 902 also uploads 906 a real-time video stream Video 2 904 to server 104. With a proper ID verification process, mobile computing device 102 receives 808 real-time video stream Video 1 and receives 908 real-time video stream Video 2 from server 104. Video 2 904 may be produced by the front camera of mobile computing device 902. Real-time video stream Video 2 904 is merged with real-time video stream Video 1 804 forming a real-time ViV video stream Video 3 910. The merged ViV Video 3 910 is uploaded 106 in real-time to server 104. Server 104, in turn, broadcasts ViV Video 3 910 in real-time to receivers 110-116.

It is appreciated that Video 2 810 in FIG. 8 and Video 2 904 in FIG. 9 may be pre-processed by trimming the background from and leaving the subject alone in the pre-processed video streams as shown in FIG. 5. Furthermore the subject in the ViV video stream can be scaled. Thus the merged ViV video stream will be Video 3 502 or Video 3 702 as shown in FIG. 7 in accordance with the teachings of the preset invention.

It is also appreciated that the real-time uploading and real-time broadcasting may include delays caused by the Internet traffic. In one example, a delay of up to several seconds may be considered real-time for purposes of this disclosure in accordance with the teachings of the present invention. In another example, it is appreciated that a longer delay may still also be considered real-time for purposes of this disclosure in accordance with the teachings of the present invention.

As mentioned previously, the processes explained above may be implemented with the utilization of computer software and hardware. The techniques described may constitute machine-executable instructions embodied within a tangible or non-transitory machine (e.g., computer) readable storage medium, that when executed by a machine, such as for example video processor 400, will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, mobile computing device, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A mobile computing device, comprising:
   a first video camera on a first side of the mobile computing device producing a first camera video stream;
   a second video camera on a second side of the mobile computing device producing a second camera video stream;
   a video processor coupled to the first video camera and the second video camera to receive the first camera video stream and the second camera video stream, respectively, the video processor is coupled to merge the first camera video stream and the second camera video stream to generate a merged video stream, the video processor including a network interface coupled to upload the merged video stream to a server in real-time using an Internet wireless network, wherein the video processor alters an aspect ratio of at least one of the first camera video stream and the second camera video stream prior to generating the merged video stream, and wherein the server broadcasts the merged video stream to a plurality of receivers in real-time, and wherein the first camera video stream and the second camera video stream include a first audio signal and a second audio signal, respectively, which are sent to an audio processor to merge the first audio signal and the second audio signal into a merged audio signal, and wherein the merged audio signal is uploaded to the server in real-time using an Internet wireless network with the merged video stream; and an identification, wherein the server is coupled to verify the identification of the mobile computing device and to authorize the mobile computing device with a password to upload the merged video stream to the server before the mobile computing device uploads the merged video stream to the server, wherein the server broadcasts the merged video stream and the merged audio signal to the plurality of receivers, which are preselected by the mobile computing device prior to the server broadcasting in real-time;

wherein each of the plurality of receivers has a unique identification; and wherein the server verifies the unique identification of each of the plurality of receivers that have been preselected by the mobile computing device before the server broadcasts the merged video stream to the plurality of receivers in real-time.

2. The mobile computing device of claim 1, wherein the video processor further comprises:

a first pre-processor coupled to the first video camera to receive the first camera video stream to generate a pre-processed first camera video stream;

a second pre-processor coupled to the second video camera to receive the second camera video stream to generate a pre-processed second camera video stream;

a merger coupled to the first pre-processor to receive the pre-processed first camera video stream, and coupled to the second pre-processor to receive the pre-processed second camera video stream, the merger coupled to merge the pre-processed first camera video stream and the pre-processed second camera video stream to generate the merged video stream; and a compressor coupled to the merger to receive the merged video stream, the compressor coupled to compress the merged video stream to generate a compressed merged video stream, wherein the network interface is coupled to upload the compressed merged video stream to the server in real-time using the Internet wireless network.

3. The mobile computing device of claim 2, wherein the first pre-processor is coupled to trim a background from the first camera video stream to leave a subject alone in the pre-processed first camera video stream, wherein the subject is a user of the mobile computing device.

4. The mobile computing device of claim 3, wherein the first pre-processor is further coupled to scale the subject in the pre-processed first camera video stream.

5. The mobile computing device of claim 3, wherein the first pre-processor is coupled to utilize chroma key compositing to trim the background from the first camera video stream.

6. The mobile computing device of claim 3, wherein the first pre-processor further comprises:

a face detection unit coupled to the first video camera to receive the first camera video stream, wherein the face detection unit is coupled to determine a location of a face of the subject in the first camera video stream;

a face edge detection unit coupled to the face detection unit, wherein the face edge detection unit is coupled to detect an edge of the face of the subject in the first camera video stream;

a subject identification unit coupled to the face edge detection unit, wherein the subject identification unit is coupled to identify a body of the subject in the first camera video stream; and a background trimming unit coupled to the subject identification unit, wherein the background trimming unit is coupled to trim the background from the first camera video stream to leave the face and body of the subject alone in the pre-processed first camera video stream.

7. The mobile computing device of claim 1, wherein the Internet wireless network includes at least one of a Wi-Fi network, a mobile broadband network, and a telephone network.

8. The mobile computing device of claim 1, wherein the real-time uploading and the real-time broadcasting include delays caused by Internet traffic.

9. The mobile computing device of claim 1, wherein the mobile computing device is one of a mobile phone, a smartphone or a tablet computer.

10. A network comprising:

a server;

a first video camera coupled to produce a first camera video stream;

a second video camera coupled to produce a second camera video stream; and a video processor of a mobile computing device connected to the server and connected to the first video camera and the second video camera to receive the first camera video stream and the second camera video stream, respectively, the video processor is coupled to merge the first camera video stream and the second camera video stream to generate a merged video stream, wherein the video processor alters an aspect ratio of at least one of the first camera video stream and the second camera video stream prior to generating the merged video stream, and wherein the video processor including a network interface coupled to upload the merged video stream to the server in real-time, wherein the first camera video stream and the second camera video stream include a first audio signal and a second audio signal, respectively, which are sent to an audio processor to merge the first audio signal and the second audio signal into a merged audio signal, and wherein the merged audio signal is uploaded to the server in real-time using an Internet wireless network with the merged video stream;

an identification, wherein the server is coupled to verify the identification of the mobile computing device and to authorize the mobile computing device with a password to upload the merged video stream to the server before the mobile computing device uploads the merged video stream to the server; and a plurality of receivers connected to the server to receive the merged video stream broadcasted by the server in real-time, wherein the plurality of receivers are preselected by the mobile computing device prior to the server broadcasting in real-time;

wherein each of the plurality of receivers has a unique identification; and wherein the server verifies the unique identification of each of the plurality of receivers that have been preselected by the mobile computing device before the server broadcasts the merged video stream to the plurality of receivers in real-time.

11. The network of claim 10, wherein the video processor further comprises:

a first pre-processor coupled to the first video camera to receive the first camera video stream to generate a pre-processed first camera video stream;

a second pre-processor coupled to the second video camera to receive the second camera video stream to generate a pre-processed second camera video stream;

a merger coupled to the first pre-processor to receive the pre-processed first camera video stream, and coupled to the second pre-processor to receive the pre-processed second camera video stream, the merger coupled to merge the pre-processed first camera video stream and the pre-processed second camera video stream to generate the merged video stream; and a compressor coupled to the merger to receive the merged video stream, the compressor coupled to compress the merged video stream to generate a compressed merged video stream, wherein the network interface is coupled to upload the compressed merged video stream to the server in real-time using the Internet wireless network.

12. The network of claim 11, wherein the first pre-processor is coupled to trim a background from the first camera video stream to leave a subject alone in the pre-processed first camera video stream, wherein the subject is a user of a first mobile computing device having the first video camera.

13. The network of claim 12, wherein the first pre-processor is further coupled to scale the subject in the pre-processed first camera video stream.

14. The network of claim 12, wherein the first pre-processor is coupled to utilize chroma key compositing to trim the background from the first camera video stream.

15. The network of claim 12, wherein the first pre-processor further comprises:

a face detection unit coupled to the first video camera to receive the first camera video stream, wherein the face detection unit is coupled to determine a location of a face of the subject in the first camera video stream;

a face edge detection unit coupled to the face detection unit, wherein the face edge detection unit is coupled to detect an edge of the face of the subject in the first camera video stream;

a subject identification unit coupled to the face edge detection unit, wherein the subject identification unit is coupled to identify a body of the subject in the first camera video stream; and a background trimming unit coupled to the subject identification unit, wherein the background trimming unit is coupled to trim the background from the first camera video stream to leave the face and body of the subject alone in the pre-processed first camera video stream.

16. The network of claim 11, wherein the first video camera is a front video camera on a front side of a first mobile computing device connected to the server such that the first camera video stream is a front camera video stream of the first mobile computing device, wherein the second video camera is a back video camera on a back side of the first mobile computing device such that the second camera video stream is a back camera video stream of the first mobile computing device.

17. The network of claim 11, wherein the first video camera is a front video camera on a front side of a first mobile computing device connected to the server such that the first camera video stream is a front camera video stream of the first mobile computing device, wherein the second video camera is a back video camera on a back side of a second mobile computing device connected to the server such that the second camera video stream is a back camera video stream of the second mobile computing device.

18. The network of claim 17, wherein the video processor is included in a third mobile computing device connected to the server.

19. The mobile computing device of claim 1, further comprising user-selected graphics overlaid on the first camera video stream or the second camera video stream so that the merged video stream includes the user selected graphics, wherein the plurality of receivers receive the user-selected graphics after the server verifies the unique identification of each of the plurality of receivers.

20. The mobile computing device of claim 1, wherein the merged video stream includes a third camera video stream received from the server.

* * * * *